US010278074B1

(12) United States Patent
Shen et al.

(10) Patent No.: US 10,278,074 B1
(45) Date of Patent: Apr. 30, 2019

(54) SYSTEMS AND METHODS FOR CATEGORIZING MOBILE DEVICES AS ROOTED

(71) Applicant: Symantec Corporation, Mountain View, CA (US)

(72) Inventors: Yun Shen, Bristol (GB); Azzedine Benameur, Fairfaix, VA (US); Nathan Evans, Sterling, CA (US)

(73) Assignee: Symantec Corporation, Mountain View, CA (US)

( * ) Notice: Subject to any disclaimer, the term of this patent is extended or adjusted under 35 U.S.C. 154(b) by 159 days.

(21) Appl. No.: 14/920,262

(22) Filed: Oct. 22, 2015

(51) Int. Cl.
| H04M 3/00 | (2006.01) |
| G06F 11/00 | (2006.01) |
| G06F 12/14 | (2006.01) |
| G06F 12/16 | (2006.01) |
| G08B 23/00 | (2006.01) |
| H04W 12/08 | (2009.01) |
| H04W 12/10 | (2009.01) |
| H04L 29/06 | (2006.01) |

(52) U.S. Cl.
CPC ............. *H04W 12/08* (2013.01); *H04L 63/14* (2013.01); *H04W 12/10* (2013.01)

(58) Field of Classification Search
CPC ........ H04W 12/08; H04W 12/10; H04L 63/14
USPC ........................................................ 455/410
See application file for complete search history.

(56) References Cited

U.S. PATENT DOCUMENTS

| 8,566,947 | B1* | 10/2013 | Sankruthi | G06F 21/55 726/22 |
| 8,997,230 | B1* | 3/2015 | McCauley | G06F 21/55 726/23 |
| 9,548,982 | B1* | 1/2017 | Karunakaran | H04L 63/10 |
| 2011/0247082 | A1* | 10/2011 | Buchhop | G06Q 40/02 726/28 |

(Continued)

OTHER PUBLICATIONS

"Root Detection and Evasion", http://resources.infosecinstitute.com/android-hacking-security-part-8-root-detection-evasion/, as accessed Sep. 21, 2015, Android Hacking & Security—Part 6, InfoSec Institute, (Aug. 10, 2014).

(Continued)

*Primary Examiner* — Rafael Pérez-Gutiérrez
*Assistant Examiner* — Mark G. Pannell
(74) *Attorney, Agent, or Firm* — FisherBroyles, LLP

(57) ABSTRACT

The disclosed computer-implemented method for categorizing mobile devices as rooted may include (1) gathering a set of metadata describing a plurality of rooted mobile devices that have been modified to allow a user to alter protected systems and an additional set of metadata describing a plurality of unrooted mobile devices that have not been modified to allow the user to alter the protected systems, (2) comparing the set of metadata with the additional set of metadata to determine at least one feature that differentiates the rooted mobile devices from the unrooted mobile devices, (3) determining whether the feature is present in metadata that describes an uncategorized mobile device, and (4) categorizing the uncategorized mobile device as a rooted mobile device based on the presence of the feature in the metadata that describes the uncategorized mobile device. Various other methods, systems, and computer-readable media are also disclosed.

20 Claims, 7 Drawing Sheets

(56) References Cited

U.S. PATENT DOCUMENTS

| | | | | |
|---|---|---|---|---|
| 2012/0046096 | A1* | 2/2012 | Morrison | G07F 17/3223 463/25 |
| 2013/0219507 | A1* | 8/2013 | Chang | G06F 21/60 726/26 |
| 2013/0347064 | A1* | 12/2013 | Aissi | G06F 21/30 726/2 |
| 2014/0047544 | A1* | 2/2014 | Jakobsson | G06F 21/55 726/23 |
| 2014/0082732 | A1* | 3/2014 | Britton | G06F 21/56 726/24 |
| 2014/0137246 | A1* | 5/2014 | Baluda | G06F 21/552 726/22 |
| 2015/0301570 | A1* | 10/2015 | Fine | G06F 1/28 726/22 |
| 2015/0326588 | A1* | 11/2015 | Vissamsetty | H04L 63/1491 726/23 |
| 2016/0142410 | A1* | 5/2016 | Mazzara, Jr. | H04W 12/08 726/4 |
| 2016/0232353 | A1* | 8/2016 | Gupta | G06F 21/566 |
| 2016/0248590 | A1* | 8/2016 | Benson | G06F 21/00 |
| 2016/0269403 | A1* | 9/2016 | Koutenaei | H04L 63/0861 |
| 2016/0269895 | A1* | 9/2016 | Soini | G06F 3/04847 |
| 2016/0308884 | A1* | 10/2016 | Kent | G06K 9/6277 |

OTHER PUBLICATIONS

Knuth, Gabe, "How root/jailbreak detection works on Android & iOS. Is it effective enough to place all our eggs in one basket?", http://www.brianmadden.com/blogs/gabeknuth/archive/2013/12/19/How-root-jailbreak-detection-works-on-Android--iOS-Is-it-effective-enough-to-placeall-our-eggs-in-one-basket.aspx, as accessed Sep. 21, 2015, BrianMadden.com, (Dec. 19, 2013).

"Norton Mobile Security", http://www.symantec-norton.com/Norton_Mobile_Security_2012_p116.aspx, as accessed Sep. 21, 2015, Symantec, (Jan. 4, 2012).

Benameur, Azzedine et al., "All Your Root Checks Belong to Us: The Sad State of Root Detection", Black Hat Europe 2015, Amsterdam, The Netherlands, (Nov. 10-13, 2015).

Shao, Yuru et al., "RootGuard: Protecting Rooted Android Phones", Computer, vol. 47, Issue 6, (Jun. 2014), pp. 32-40.

Park, Yeongung et al., "RGBDroid: A Novel Response-Based Approach to Android Privilege Escalation Attacks", LEET '12, 5th USENIX Workshop on Large-Scale Exploits and Emergent Threats, San Jose, CA, (Apr. 24, 2012).

Chittaranjan, Gokul et al., "Mining large-scale smartphone data for personality studies", Personal and Ubiquitous Computing, vol. 17, Issue 3, Mar. 2013, (First Online: Dec. 16, 2011).

Amos, Brandon et al., "Applying machine learning classifiers to dynamic Android malware detection at scale", 9th International Wireless Communications and Mobile Computing Conference (IWCMC), 2013, Sardinia, (Jul. 1-5, 2013).

* cited by examiner

SYSTEMS AND METHODS FOR CATEGORIZING MOBILE DEVICES AS ROOTED

BACKGROUND

Mobile devices are increasingly becoming part of every aspect of life, from making calls and sending text messages to playing music, keeping calendars, and even booking dinner reservations and hailing cabs. Some organizations are taking advantage of the ubiquity of mobile devices by incorporating users' mobile devices into their internal networks. However, while computing devices owned by an organization may be subject to certain security policies or configured with certain security software, users' personal mobile devices are often not subject to the same level of control by the organization. A user's personal mobile device may thus be less secure than other computing devices owned by an organization and may therefore be at a higher risk for malware infection.

In addition, users within an organization may choose to root their mobile devices in order to modify protected systems or settings on their devices. Although this may increase a device's versatility, this rooting process may expose the device to malware and/or otherwise decrease the state of security of the device. Unfortunately, traditional systems for detecting whether mobile devices have been rooted (and thus represent an increased security risk) may suffer from many limitations. For example, some traditional systems may only check for indicators that can be easily masked or hidden on a rooted device. Other traditional systems may only check for installed applications or specific setting modifications that may not be present on all rooted devices. An infected personal mobile device may spread malware throughout an organization's network, so it is important that personal mobile devices be kept as secure as possible. Accordingly, the instant disclosure identifies and addresses a need for additional and improved systems and methods for identifying rooted mobile devices that may represent an increased security risk within an organization.

SUMMARY

As will be described in greater detail below, the instant disclosure describes various systems and methods for categorizing mobile devices as rooted by analyzing a large number of rooted and unrooted mobile devices to determine features that predict whether a device is rooted and then using those features to determine whether uncategorized devices are rooted.

In one example, a computer-implemented method for categorizing mobile devices as rooted may include (1) gathering a set of metadata describing a group of rooted mobile devices that have been modified to allow a user to alter protected systems and an additional set of metadata describing a group of unrooted mobile devices that have not been modified to allow the user to alter the protected systems, (2) comparing the set of metadata with the additional set of metadata to determine at least one feature that differentiates the rooted mobile devices from the unrooted mobile devices, (3) determining whether the feature is present in metadata that describes an uncategorized mobile device, and (4) categorizing the uncategorized mobile device as a rooted mobile device based on the presence of the feature in the metadata that describes the uncategorized mobile device.

In some embodiments, the computer-implemented method may further include disallowing the rooted mobile device from connecting to a secure network that is governed by a security policy that prohibits rooted devices from connecting to the secure network. Additionally or alternatively, the computer-implemented method may further include categorizing an additional mobile device as an unrooted mobile device based on the absence of the feature in metadata that describes the additional mobile device and allowing the unrooted mobile device to connect to the secure network.

In some embodiments, determining whether the feature is present in the metadata that describes the uncategorized mobile device may include determining, on the uncategorized mobile device, whether the feature is present. Additionally or alternatively, determining whether the feature is present in the metadata that describes the uncategorized mobile device may include determining, at a server, whether the feature is present. In some examples, comparing the set of metadata with the additional set of metadata to determine the feature that differentiates the rooted mobile devices from the unrooted mobile devices may include using a machine-learning algorithm to determine the feature.

In some embodiments, the feature may include a category of at least one application installed on the uncategorized mobile device. In one embodiment, the feature may include a pattern of application installation behavior on the uncategorized mobile device that may include (1) the number of times applications have been installed on the uncategorized mobile device, (2) the number of times applications have been uninstalled on the uncategorized mobile device, (3) the number of times applications have been updated on the uncategorized mobile device, and/or (4) the average time between two consecutive installations or uninstallations of applications on the uncategorized mobile device.

Additionally or alternatively, the feature may include a pattern of power consumption behavior of the uncategorized mobile device that may include (1) the total power consumption by the uncategorized mobile device over a predetermined time period, (2) the average power consumption per application installed on the uncategorized mobile device, (3) the average sensor power consumption on the uncategorized mobile device, and/or (4) the average battery level on the uncategorized mobile device. In some embodiments, the feature may include a pattern of communication behavior of the uncategorized mobile device that may include (1) the total amount of data sent by the uncategorized mobile device via a network, (2) the average amount of data sent per day by the uncategorized mobile device via a network, (3) the total amount of data received by the uncategorized mobile device via a network, (4) the average amount of data received per day by the uncategorized mobile device via a network, (5) the total number of Internet Protocol addresses visited by applications installed on the uncategorized mobile device, and/or (6) the total number of ports connected to by applications installed on the uncategorized mobile device.

In some examples, categorizing the uncategorized mobile device as a rooted mobile device may include displaying a notification on the rooted mobile device indicating that the rooted mobile device is rooted. Additionally or alternatively, categorizing the uncategorized mobile device may include notifying an administrator that the uncategorized mobile device is a rooted mobile device.

In one embodiment, a system for implementing the above-described method may include (1) a gathering module, stored in memory, that gathers a set of metadata describing a group of rooted mobile devices that have been modified to allow a user to alter protected systems and an additional set of metadata describing a group of unrooted mobile devices that have not been modified to allow the user to alter the protected systems, (2) a comparison module, stored in memory, that compares the set of metadata with the additional set of metadata to determine at least one feature that differentiates the rooted mobile devices from the unrooted mobile devices, (3) a determination module, stored in memory, that determines whether the feature is present in metadata that describes an uncategorized mobile device, (4) a categorization module, stored in memory, that categorizes the uncategorized mobile device as a rooted mobile device based on the presence of the feature in the metadata that describes the uncategorized mobile device, and (5) at least one physical processor configured to execute the gathering module, the comparison module, the determination module, and the categorization module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) gather a set of metadata describing a group of rooted mobile devices that have been modified to allow a user to alter protected systems and an additional set of metadata describing a group of unrooted mobile devices that have not been modified to allow the user to alter the protected systems, (2) compare the set of metadata with the additional set of metadata to determine at least one feature that differentiates the rooted mobile devices from the unrooted mobile devices, (3) determine whether the feature is present in metadata that describes an uncategorized mobile device, and (4) categorize the uncategorized mobile device as a rooted mobile device based on the presence of the feature in the metadata that describes the uncategorized mobile device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
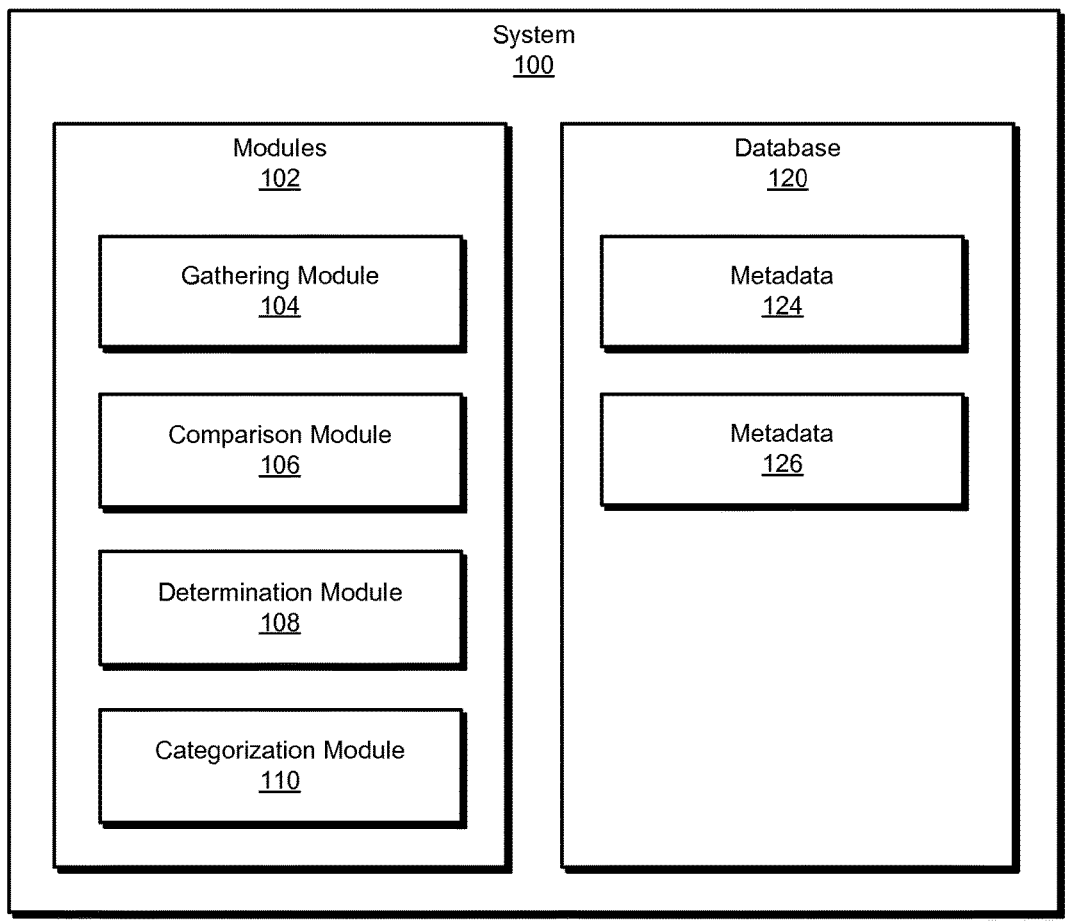
FIG. 1 is a block diagram of an exemplary system for categorizing mobile devices as rooted.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for categorizing mobile devices as rooted. As will be explained in greater detail below, by using a large number of features found in the metadata of rooted mobile devices to determine whether uncategorized mobile devices are rooted, the systems and methods herein may determine whether devices are rooted with a high degree of accuracy despite any attempts made by the device to mask the common signs of being rooted.

The following will provide, with reference to FIGS. 1, 2, 4, and 5, detailed descriptions of exemplary systems for categorizing mobile devices as rooted. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for categorizing mobile devices as rooted. As illustrated in this figure, exemplary system 100 may include one or more modules 102 for performing one or more tasks. For example, and as will be explained in greater detail below, exemplary system 100 may include a gathering module 104 that gathers a set of metadata describing a plurality of rooted mobile devices that have been modified to allow a user to alter protected systems and an additional set of metadata describing a plurality of unrooted mobile devices that have not been modified to allow the user to alter the protected systems. Exemplary system 100 may additionally include a comparison module 106 that compares the set of metadata with the additional set of metadata to determine at least one feature that differentiates the rooted mobile devices from the unrooted mobile devices. Exemplary system 100 may also include a determination module 108 that determines whether the feature is present in metadata that describes an uncategorized mobile device. Exemplary system 100 may additionally include a categorization module 110 that categorizes the uncategorized mobile device as a rooted mobile device based on the presence of the feature in the metadata that describes the uncategorized mobile device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2

Figure 6:
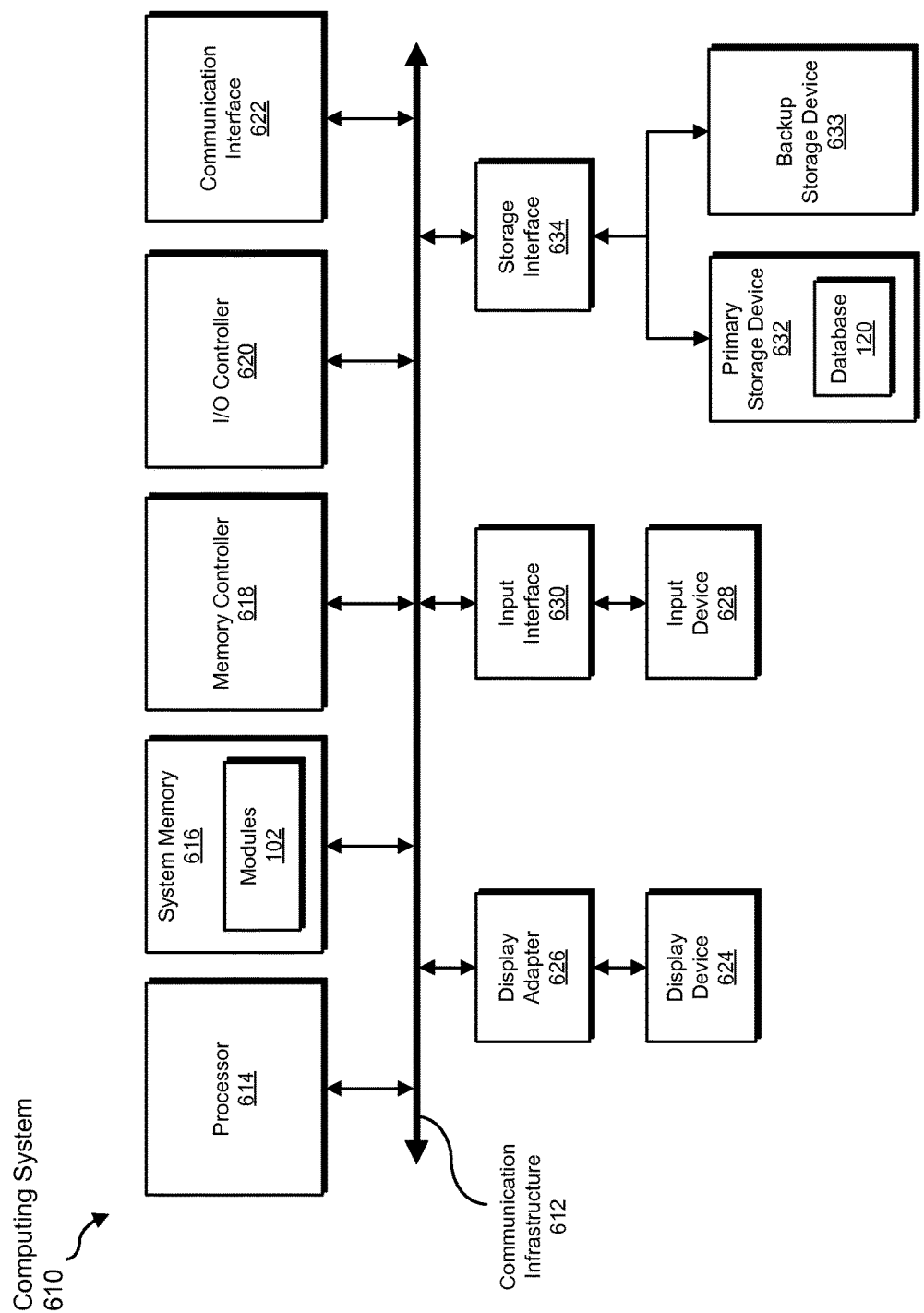
FIG. 6 is a block diagram of an exemplary computing system capable of implementing one or more of the embodiments described and/or illustrated herein.
Figure 7:
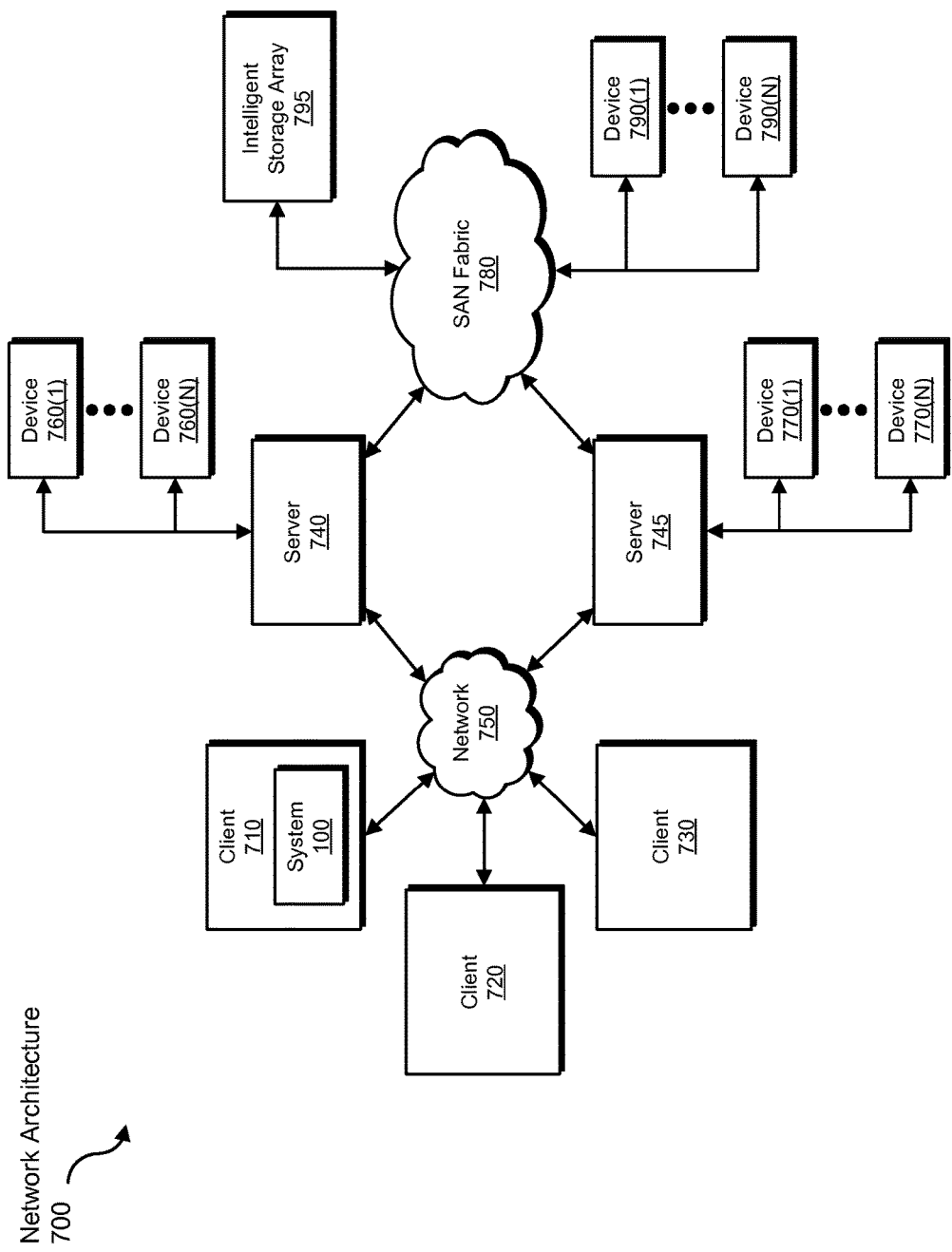
FIG. 7 is a block diagram of an exemplary computing network capable of implementing one or more of the embodiments described and/or illustrated herein.

(e.g., mobile device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store metadata collected from previously categorized mobile devices, such as metadata 124 and/or metadata 126.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Figure 2:
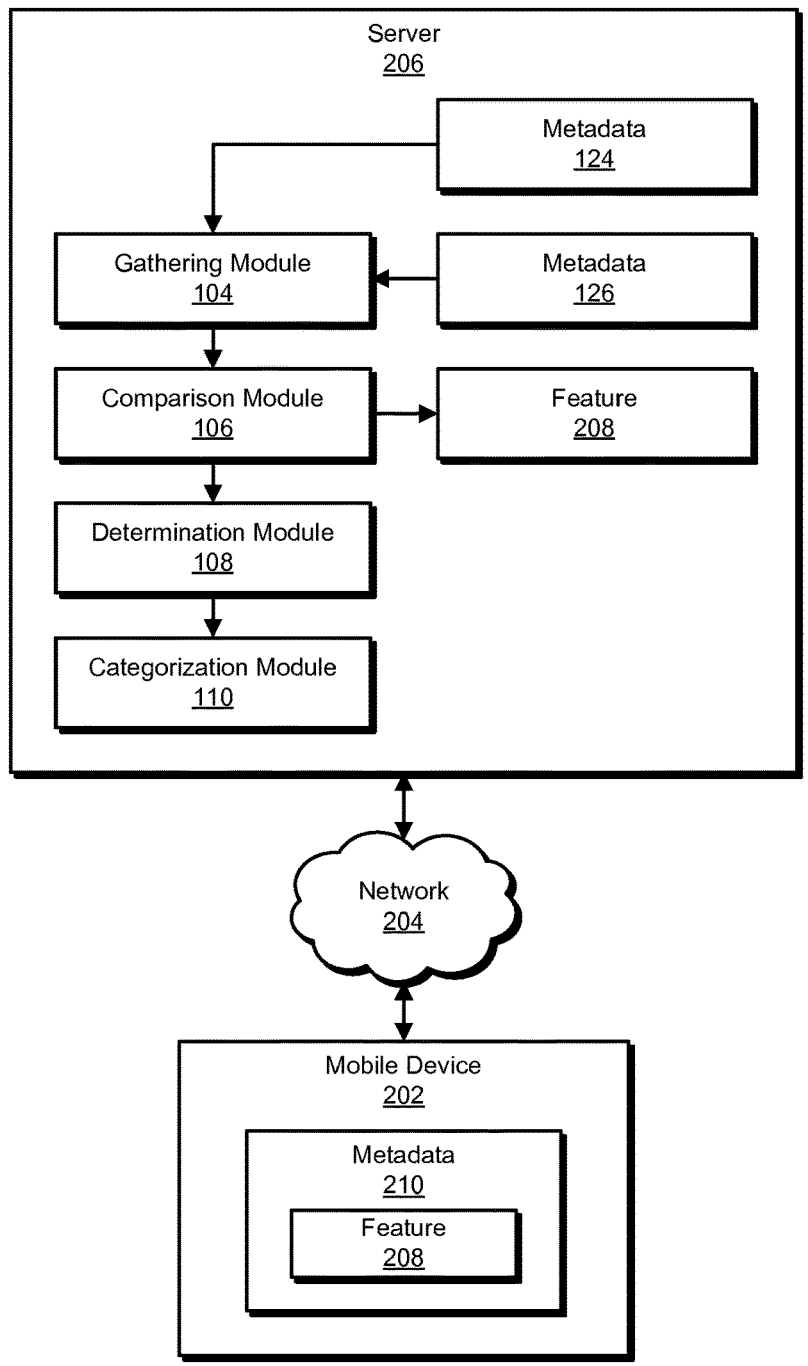
FIG. 2 is a block diagram of an additional exemplary system for categorizing mobile devices as rooted.

Exemplary system 100 in FIG. 1 may be implemented in a variety of ways. For example, all or a portion of exemplary system 100 may represent portions of exemplary system 200 in FIG. 2. As shown in FIG. 2, system 200 may include a mobile device 202 in communication with a server 206 via a network 204. In one example, mobile device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of mobile device 202 and/or server 206, enable mobile device 202 and/or server 206 to categorize mobile devices as rooted. For example, and as will be described in greater detail below, gathering module 104 may gather metadata 124 describing a plurality of rooted mobile devices that have been modified to allow a user to alter protected systems and metadata 126 describing a plurality of unrooted mobile devices that have not been modified to allow the user to alter the protected systems. Next, comparison module 106 may compare metadata 124 with metadata 126 to determine at least one feature 208 that differentiates the rooted mobile devices from the unrooted mobile devices. At some later time, determination module 108 may determine whether feature 208 is present in metadata 210 that describes mobile device 202. Finally, categorization module 110 may categorize mobile device 202 as a rooted mobile device based on the presence of feature 208 in metadata 210.

Mobile device 202 generally represents any type or form of computing device capable of reading computer-executable instructions. Examples of mobiles device 202 include, without limitation, laptops, tablets, cellular phones, Personal Digital Assistants (PDAs), multimedia players, embedded systems, wearable devices (e.g., smart watches, smart glasses, etc.), combinations of one or more of the same, exemplary computing system 610 in FIG. 6, or any other suitable computing device.

Server 206 generally represents any type or form of computing device that is capable of analyzing metadata. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between mobile device 202 and server 206.

Figure 3:
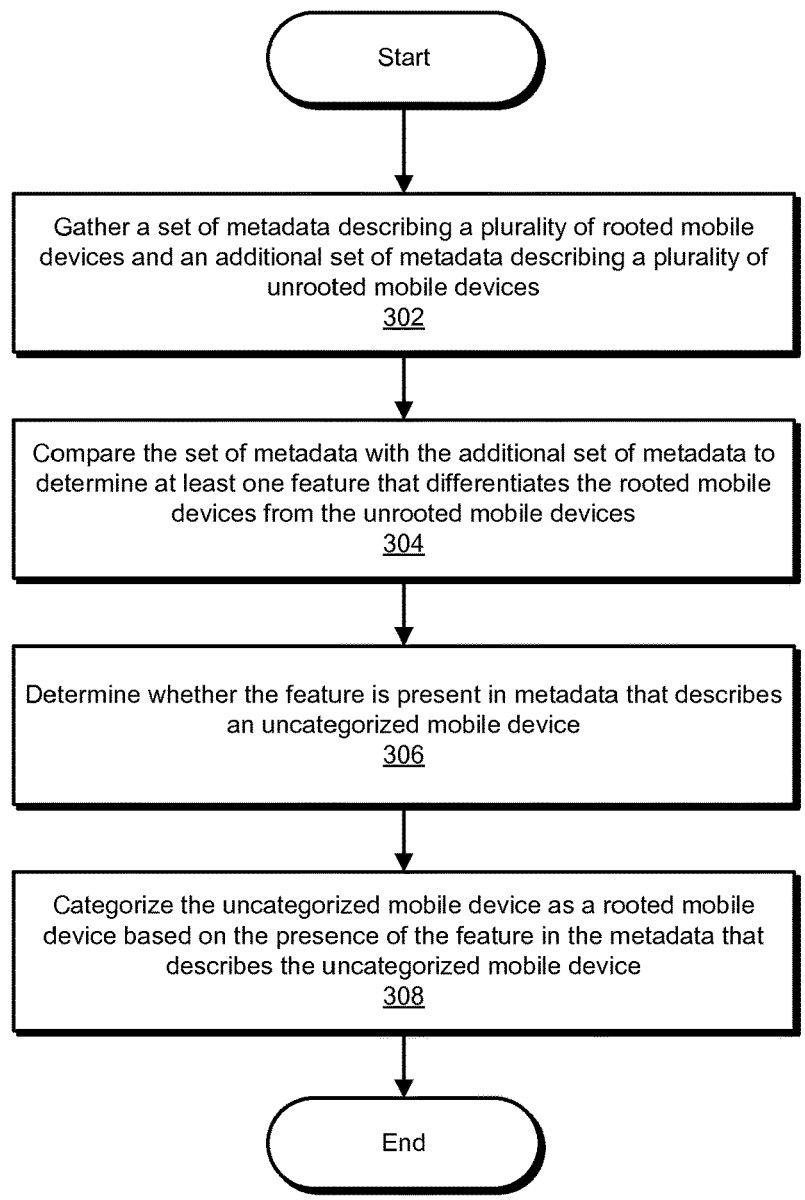
FIG. 3 is a flow diagram of an exemplary method for categorizing mobile devices as rooted.

FIG. 3 is a flow diagram of an exemplary computer-implemented method 300 for categorizing mobile devices as rooted. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may gather a set of metadata describing a plurality of rooted mobile devices that have been modified to allow a user to alter protected systems and an additional set of metadata describing a plurality of unrooted mobile devices that have not been modified to allow the user to alter the protected systems. For example, gathering module 104 may, as part of server 206 in FIG. 2, gather metadata 124 describing a plurality of rooted mobile devices that have been modified to allow a user to alter protected systems and metadata 126 describing a plurality of unrooted mobile devices that have not been modified to allow the user to alter the protected systems.

The term "metadata," as used herein, generally refers to any information describing a mobile device, the actions taken on and/or by a mobile device, files hosted on and/or downloaded by a mobile device, and/or any other properties of a mobile device. In some embodiments, metadata about a mobile device may include applications installed on the mobile device, power usage by various components of the mobile device, Internet sites, services, and/or servers connected to by the mobile device, modifications to settings of the mobile device, and/or other behavior of the mobile device.

The term "rooted mobile device," as used herein, generally refers to a mobile device that has been modified to allow a user to install application, modify settings, and/or make changes to protected systems that would otherwise be disallowed by the default factory settings for the mobile device. In addition, the term "protected system," as used herein, generally refers to any systems and/or setting that is designed to not be modified by an end user. Examples of a protected system may include, without limitation, firmware, the operating system of a device, processor settings on the device, and/or other hardware settings for the device. In some embodiments, a user may root a mobile device by using an application to gain root access (i.e., superuser access) to their mobile device. In some examples, the application used to root the mobile device may also conceal signs that the mobile device is rooted. In some embodiments, a rooted mobile device may be an ANDROID mobile device that has been rooted. In other embodiments, a rooted mobile device may be an APPLE mobile device that has been jailbroken.

The term "unrooted mobile device," as used herein, typically refers to any device that has not been modified to allow the user to make changes to protected systems. In some embodiments, mobile devices with default factory settings may represent unrooted mobile devices.

Gathering module 104 may gather information about the rooted and unrooted mobile devices in a variety of ways. For example, gathering module 104 may gather information about mobile devices that was collected by an application (e.g., NORTON MOBILE SECURITY) on the mobile devices. In another embodiment, gathering module 104 may gather information submitted by users of the devices. Additionally or alternatively, gathering module 104 may gather information from a variety of sources, including one or more application installed on mobile devices, information previously collected about mobile devices for other purposes, and/or user submitted information about mobile devices.

At step 304, one or more of the systems described herein may compare the set of metadata with the additional set of metadata to determine at least one feature that differentiates the rooted mobile devices from the unrooted mobile devices. For example, comparison module 106 may, as part of server 206 in FIG. 2, compare metadata 124 with metadata 126 to determine at least one feature 208 that differentiates the rooted mobile devices from the unrooted mobile devices.

The term "feature," as used herein, generally refers to any attribute or aspect of a mobile device, applications installed on a mobile device, behavior of a mobile device, behavior of a user of a mobile device, behavior of an application on a mobile device, and/or configuration of a mobile device. Extensive discussion of exemplary features will be provided below.

Comparison module 106 may compare the metadata to determine the feature in a variety of ways. For example, comparison module 106 may process the metadata through a series of classifiers in order to determine the feature set. In one embodiment, one or more classifiers may include one or more machine-learning algorithms such as Random Forest, Extremely Randomized Trees, Naive Bayesian, Ada Boost, K-Nearest Neighbors, and/or Gradient Boosting Decision Tree. Additionally or alternatively, one or more classifiers may include a linear regression algorithm. For example, comparison module 106 may include a level one classifier that may include several different machine-learning algorithms and a level two classifier that may include a linear regression algorithm. In this example, comparison module 106 may use the classifiers to analyze metadata about the rooted and unrooted devices and determine features that typically characterize rooted devices.

Figure 4:
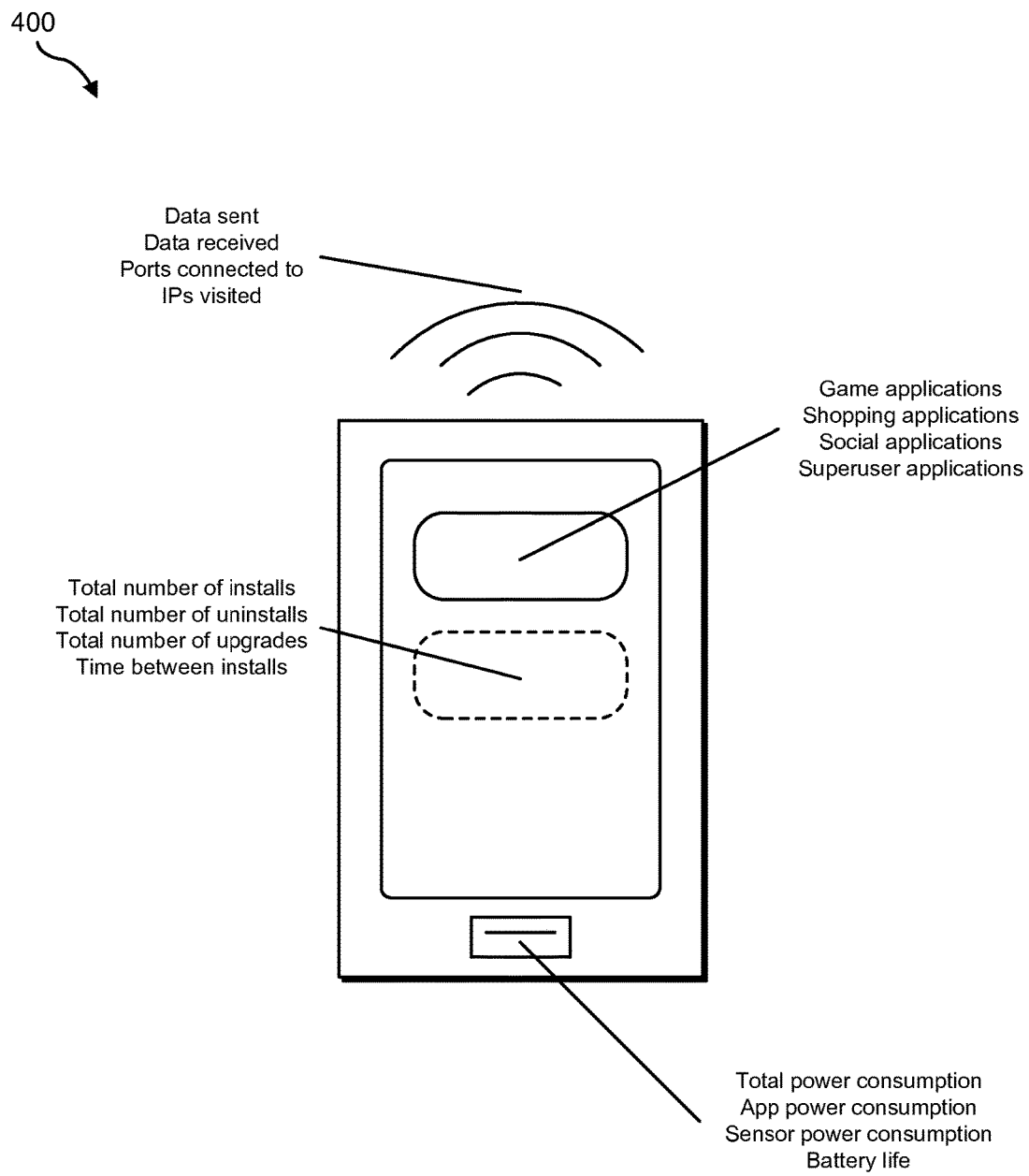
FIG. 4 is a block diagram of an exemplary computing system for categorizing mobile devices as rooted.
Figure 5:
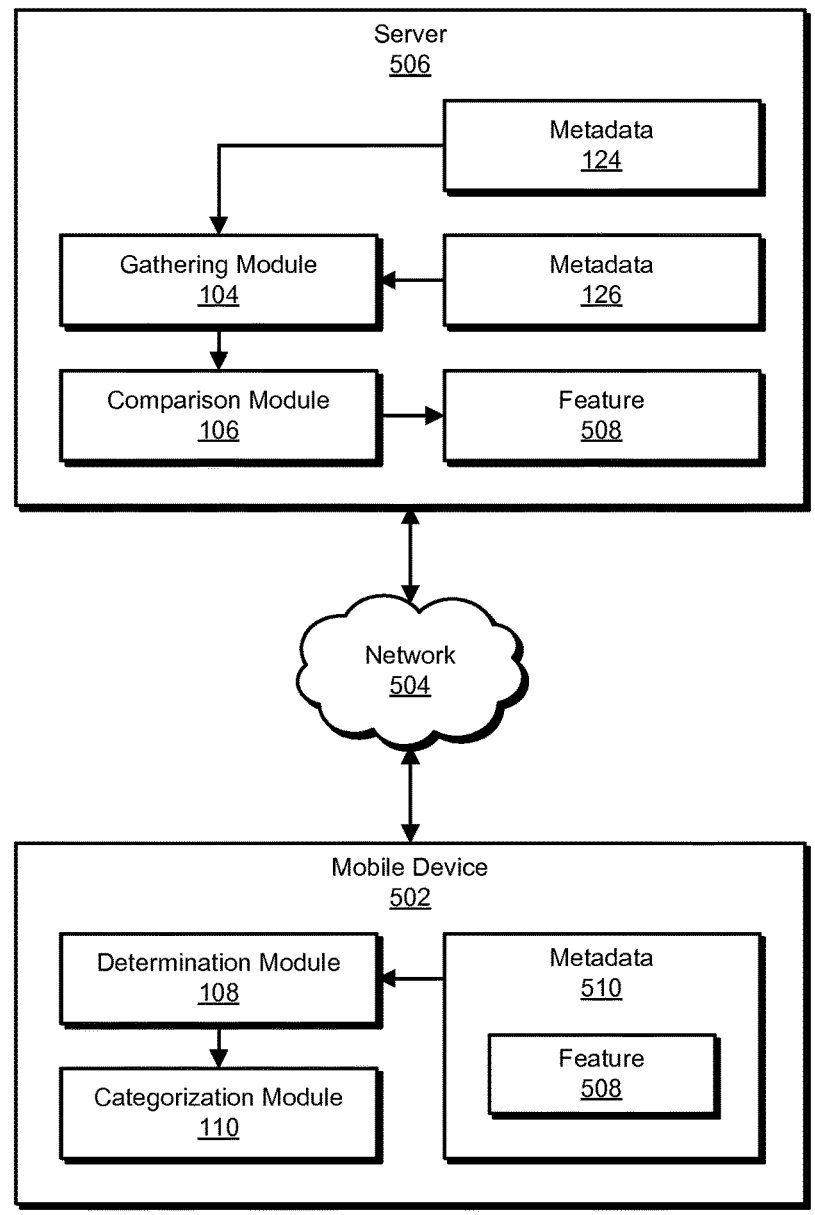
FIG. 5 is a block diagram of an exemplary computing system for categorizing mobile devices as rooted.

In some embodiments, comparison module 106 may determine various categories of features that characterize a rooted device. FIG. 4 is a block diagram of an exemplary computing system 400 for categorizing mobile devices as rooted based on various features. As illustrated in FIG. 4, the feature may include a category of at least one application installed on the uncategorized mobile device. Examples of categories of application may include books and reference, business, comics, communication, education, entertainment, family, finance, games, health and fitness, libraries and demonstration, lifestyle, audio and visual, medical, news and magazines, personalization, photography, productivity, shopping, social, sports, tools, transportation, travel and local, weather, superuser, system, and/or other. For example, comparison module 106 may determine that mobile devices with at least one superuser application, a high number of personalization applications, and/or a high number of tools applications are likely to be rooted.

In some embodiments, the application categories may also include malware applications, such as backdoor applications, spyware application, Trojan applications, privacy-violating applications, and/or information-stealing applications. In some examples, the application categories may also include applications used for potentially malicious purposes, such as hacking applications.

Additionally or alternatively, the feature may include (1) a pattern of application installation behavior on the mobile device that includes the number of times applications have been installed on the mobile device, (2) the number of times applications have been uninstalled on the mobile device, (3) the number of times applications have been updated on the mobile device, and/or (4) the average time between two consecutive installations, updates, and/or uninstallations of applications on the mobile device. In some examples, the pattern of installation behavior may also include the total number of applications currently installed on the mobile device, the total number of foreground seconds accumulated by all applications, and/or the average number of foreground seconds per application. In some embodiments, the pattern of application installation behavior may also include the behavior of certain categories of application. For example, the pattern of application installation behavior may include the number of installations, uninstallations, and/or updates of system applications on the mobile device. The pattern of application installation behavior may also include the time between installation and uninstallation of a particular application and/or the average time between installation and uninstallation across all applications. Additionally or alternatively, the pattern of application installation behavior may include the time between two incidents of the same time of installation behavior, such as between the installation of one application and the next, the uninstallation of one application and the next, and/or the updating of one application and the next. For example, comparison module 106 may determine that mobile devices with frequent installations and uninstallations of applications are more likely to be rooted.

In one embodiment, the feature may include a pattern of power consumption behavior of the mobile device that includes the total power consumption by the mobile device over a predetermined time period, the average power consumption by the mobile device per day, the total number of seconds the mobile device has been powered on, the average power consumption per application installed on the mobile device, the average sensor power consumption on the mobile device, and/or the average battery level on the mobile device. In some embodiments, the feature may also include the average central processing unit (CPU) time for each application and/or the total cumulative CPU time for all applications. Additionally or alternatively, the feature may also include the total number of application crashes on the mobile device and/or the number of unique crash reports stored on and/or sent by the mobile device. For example, comparison module 106 may determine that rooted mobile devices tend to have a higher percentage of battery power consumed by applications than unrooted mobile devices.

Additionally or alternatively, the feature may include a pattern of communication behavior of the mobile device that includes the total amount of data sent and/or received by the mobile device via a network and/or the average amount of data sent and/or received per day by the mobile device via a network. In some embodiments, the amount of data sent and/or received by the mobile device may be measured in bytes. Additionally or alternatively, comparison module 106 may treat the amount of data sent and/or received via a mobile device network as different features from the amount of data sent and/or received via a wireless network and/or the amount of data sent/received via all means of data transmission available to the mobile device. In some embodiments, comparison module 106 may treat specific networks as different features. For example, the total amount of data sent via the user's private home network may be a different feature than the total amount of data sent via all wireless networks.

In some embodiments, the pattern of communication may also include the total number of Internet Protocol (IP) addresses visited by applications installed on the mobile device and/or the total number of ports connected to by applications installed on the mobile device. In one embodiment, the pattern of communication may additionally include the average number of IP addresses visited per application, the number of unique IP addresses visited by a given application over a predetermined time period, the average gap between visits to two different IP addresses, the number of blacklisted IP addresses visited by a given application, and/or the total number of distinct blacklisted IP addresses visited by all applications. Additionally or alternatively, the pattern of communication may include the total number of non-standard ports visited by applications, the number of unique non-standard ports visited by applications, and/or the number of visits to non-standard ports by applications, the total number of standard ports visited by applications. The term "non-standard ports," as used herein, refers to ports being used for services not assigned to that port in the Service Name and Transport Protocol Port Number Registry. For example, comparison module 106 may determine that rooted mobile devices visit a much higher number of non-standard ports and/or blacklisted IP addresses than unrooted mobile devices.

Returning to FIG. 3, at step 306, one or more of the systems described herein may determine whether the feature is present in metadata that describes an uncategorized mobile device. For example, determination module 108 may, as part of server 206 in FIG. 2, determine whether feature 208 is present in metadata 210 that describes mobile device 202.

Determination module 108 may determine whether the feature is present in a variety of contexts. For example, determination module 108 may determine whether the feature is present in the metadata that describes the mobile device by determining, at a server, whether the feature is present. In some embodiments, determination module 108 may receive metadata about the mobile device from an application on the mobile device.

Additionally or alternatively, determination module 108 may determine whether the feature is present in the metadata that describes the mobile device by determining, on the mobile device, whether the feature is present. As illustrated in system 500 in FIG. 5, a server 506 may include gathering module 104 and/or comparison module 106, as well as metadata 124 and/or metadata 126 and/or feature 508. In this embodiment, server 506 may be an analysis server configured to determine what features predict whether a mobile device is rooted. In some embodiments, server 506 may communicate with a mobile device 502 via a network 504. In these embodiments, mobile device 502 may include determination module 108, which may process metadata 510 about mobile device 502. In some examples, metadata 510 may include feature 508 that indicates to categorization module 110 that mobile device 502 is a rooted mobile device.

Returning to FIG. 3, at step 308, one or more of the systems described herein may categorize the uncategorized mobile device as a rooted mobile device based on the presence of the feature in the metadata that describes the uncategorized mobile device. For example, categorization module 110 may, as part of server 206 in FIG. 2, categorize mobile device 202 as a rooted mobile device based on the presence of feature 208 in metadata 210.

Categorization module 110 may categorize the mobile device as rooted in a variety of ways. In some embodiments, categorization module 110 may categorize the mobile device as rooted based on the total weighted value of the features found in the mobile device's metadata exceeding a predetermined threshold. For example, categorization module 110 may determine that because the mobile device has two superuser applications, a highly weighted feature, and visits a large number of blacklisted IP addresses, a moderately weighted feature, the mobile device is likely rooted.

In some examples, the systems described herein may disallow the rooted mobile device from connecting to a secure network that is governed by a security policy that prohibits rooted devices from connecting to the secure network. For example, an organization may allow members of the organization to connect their personal mobile devices to the organization's private network if the mobile devices meet a certain security standard. In this example, the organization's security standard may prohibit rooted mobile devices from connecting to the organization's private network due to the increased security risk posed by rooted devices.

In one example, categorization module 110 may categorize an additional mobile device as an unrooted mobile device based on the absence of the feature in metadata that describes the additional mobile device. In some embodiments, categorization module 110 may categorize a device as unrooted if the device has some features that predict whether a device is rooted, but not enough features to meet a predetermined threshold for the probability that the device is rooted. For example, categorization module 110 may determine that, based on the features present in the metadata describing a device, the device has a 20% chance of being rooted. In this example, categorization module 110 may categorize the device as unrooted due to the device failing to meet an 80% certainty threshold for categorizing devices as rooted. In this example, the systems described herein may allow the unrooted mobile device to connect to a secure network in response to determining that the mobile device is unrooted. For example, the systems described herein may allow a user's personal mobile device to connect to an organization's internal network if categorization module 110 categorized the device as unrooted.

In some embodiments, the systems described herein may display a notification on the mobile device indicating that the mobile device is rooted. For example, categorization module 110 may be part of an application on the mobile device. In this example, the application on the mobile device may display a notification with information about the category of the mobile device according to categorization module 110. In another embodiment, categorization module 110 may be located on a server and may send a message to be displayed by the mobile device with information about the categorization of the mobile device. Additionally or alternatively, categorization module 110 may send a message to an administrator about the categorization of the mobile device. For example, categorization module 110 may display a message on a device categorization monitoring console used by the administrator to track the status of one or more devices being evaluated for potential inclusion into a secure network.

As described in connection with method 300 above, the systems and methods described herein may analyze a large body of metadata describing both rooted and unrooted mobile devices in order to derive features that predict whether a mobile device is rooted or not. By using a mobile device's communication behavior, power consumption behavior, application installation behavior, and application categories as well as other features to predict whether the mobile device is rooted or not, the systems and methods described herein may be able to identify rooted devices with a high degree of accuracy without being foiled by the various methods that mobile devices use to obscure signs of being rooted.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for categorizing mobile devices as rooted.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive metadata to be transformed, transform the metadata into a set of features, output a result of the transformation to one or more machine-learning algorithms, use the result of the transformation to determine which features predict whether a device is rooted, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for categorizing mobile devices as rooted, at least a portion of the method being performed by a computing device comprising at least one processor, the method comprising:
    gathering a set of metadata describing a plurality of rooted mobile devices that have been modified to allow a user to alter protected systems and an additional set of metadata describing a plurality of unrooted mobile devices that have not been modified to allow the user to alter the protected systems;
    comparing the set of metadata with the additional set of metadata by processing the metadata and the additional set of metadata through a series of classifiers comprising a machine-learning algorithm and a linear regression algorithm to determine at least one feature that differentiates the rooted mobile devices from the unrooted mobile devices, wherein the at least one feature comprises an application category including one or more malware application types and one or more applications used for potentially malicious purposes;
    determining whether the at least one feature is present in metadata that describes an uncategorized mobile device;
    categorizing the uncategorized mobile device as a rooted mobile device based on a total weighted value of the at least one feature present in the metadata exceeding a predetermined threshold; and
    protecting a secure network against the one or more malware application types and the one or more applications used for potentially malicious purposes potentially present on the rooted device by disallowing the rooted mobile device from connecting to the secure network.

2. The computer-implemented method of claim 1, wherein the secure network is governed by a security policy that prohibits rooted devices from connecting to the secure network.

3. The computer-implemented method of claim 2, further comprising:
    categorizing an additional mobile device as an unrooted mobile device based on the absence of the at least one feature in metadata that describes the additional mobile device; and
    allowing the unrooted mobile device to connect to the secure network.

4. The computer-implemented method of claim 1, wherein determining whether the at least one feature is present in the metadata that describes the uncategorized mobile device comprises determining, on the uncategorized mobile device, whether the at least one feature is present.

5. The computer-implemented method of claim 1, wherein determining whether the at least one feature is present in the metadata that describes the uncategorized mobile device comprises determining, at a server, whether the at least one feature is present.

6. The computer-implemented method of claim 1, wherein the one or more applications used for potentially malicious purposes are installed on the uncategorized mobile device.

7. The computer-implemented method of claim 1, wherein the at least one feature comprises a pattern of application installation behavior on the uncategorized mobile device that comprises at least one of:
    a number of times applications have been installed on the uncategorized mobile device;
    a number of times applications have been uninstalled on the uncategorized mobile device;
    a number of times applications have been updated on the uncategorized mobile device;

an average time between two consecutive installations or uninstallations of applications on the uncategorized mobile device.

8. The computer-implemented method of claim 1, wherein the at least one feature comprises a pattern of power consumption behavior of the uncategorized mobile device that comprises at least one of:
  a total power consumption by the uncategorized mobile device over a predetermined time period;
  an average power consumption per application installed on the uncategorized mobile device;
  an average sensor power consumption on the uncategorized mobile device;
  an average battery level on the uncategorized mobile device.

9. The computer-implemented method of claim 1, wherein the at least one feature comprises a pattern of communication behavior of the uncategorized mobile device that comprises at least one of:
  a total amount of data sent by the uncategorized mobile device via a network;
  an average amount of data sent per day by the uncategorized mobile device via a network;
  a total amount of data received by the uncategorized mobile device via a network;
  an average amount of data received per day by the uncategorized mobile device via a network;
  a total number of Internet Protocol addresses visited by applications installed on the uncategorized mobile device;
  a total number of ports connected to by applications installed on the uncategorized mobile device.

10. The computer-implemented method of claim 1, wherein categorizing the uncategorized mobile device as a rooted mobile devices comprises at least one of:
  displaying a notification on the rooted mobile device indicating that the rooted mobile device is rooted;
  notifying an administrator that the uncategorized mobile device comprises a rooted mobile device.

11. A system for categorizing mobile devices as rooted, the system comprising:
  a gathering module, stored in memory, that gathers a set of metadata describing a plurality of rooted mobile devices that have been modified to allow a user to alter protected systems and an additional set of metadata describing a plurality of unrooted mobile devices that have not been modified to allow the user to alter the protected systems;
  a comparison module, stored in memory, that compares the set of metadata with the additional set of metadata by processing the metadata and the additional set of metadata through a series of classifiers comprising a machine-learning algorithm and a linear regression algorithm to determine at least one feature that differentiates the rooted mobile devices from the unrooted mobile devices, wherein the at least one feature comprises an application category including one or more malware application types and one or more applications used for potentially malicious purposes;
  a determination module, stored in memory, that determines whether the at least one feature is present in metadata that describes an uncategorized mobile device;
  a categorization module, stored in memory, that:
  categorizes the uncategorized mobile device as a rooted mobile device based on a total weighted value of the at least one feature present in the metadata exceeding a predetermined threshold; and
  protects a secure network against the one or more malware application types and the one or more applications used for potentially malicious purposes potentially present on the rooted device by disallowing the rooted mobile device from connecting to the secure network; and
  at least one physical processor configured to execute the gathering module, the comparison module, the determination module, and the categorization module.

12. The system of claim 11, wherein the secure network is governed by a security policy that prohibits rooted devices from connecting to the secure network.

13. The system of claim 12, wherein the categorization module:
  categorizes an additional mobile device as an unrooted mobile device based on the absence of the at least one feature in metadata that describes the additional mobile device; and
  allows the unrooted mobile device to connect to the secure network.

14. The system of claim 11, wherein the determination module determines whether the at least one feature is present in the metadata that describes the uncategorized mobile device by determining, on the uncategorized mobile device, whether the at least one feature is present.

15. The system of claim 11, wherein the determination module determines whether the at least one feature is present in the metadata that describes the uncategorized mobile device by determining, at a server, whether the at least one feature is present.

16. The system of claim 11, wherein the one or more applications used for potentially malicious purposes installed on the uncategorized mobile device.

17. The system of claim 11, wherein the at least one feature comprises a pattern of application installation behavior on the uncategorized mobile device that comprises at least one of:
  a number of times applications have been installed on the uncategorized mobile device;
  a number of times applications have been uninstalled on the uncategorized mobile device;
  a number of times applications have been updated on the uncategorized mobile device;
  an average time between two consecutive installations or uninstallations of applications on the uncategorized mobile device.

18. A non-transitory computer-readable medium comprising one or more computer-readable instructions that, when executed by at least one processor of a computing device, cause the computing device to:
  gather a set of metadata describing a plurality of rooted mobile devices that have been modified to allow a user to alter protected systems and an additional set of metadata describing a plurality of unrooted mobile devices that have not been modified to allow the user to alter the protected systems;
  compare the set of metadata with the additional set of metadata by processing the metadata and the additional set of metadata through a series of classifiers comprising a machine-learning algorithm and a linear regression algorithm to determine at least one feature that differentiates the rooted mobile devices from the unrooted mobile devices, wherein the at least one feature comprises an application category including one or more malware application types and one or more applications used for potentially malicious purposes;

determine whether the at least one feature is present in metadata that describes an uncategorized mobile device;

categorize the uncategorized mobile device as a rooted mobile device based on a total weighted value of the at least one feature present in the metadata exceeding a predetermined threshold; and protect a secure network against the one or more malware application types and the one or more applications used for potentially malicious purposes potentially present on the rooted device by disallowing the rooted mobile device from connecting to the secure network.

19. The non-transitory computer-readable medium of claim 18, wherein the secure network is governed by a security policy that prohibits rooted devices from connecting to the secure network.

20. The non-transitory computer-readable medium of claim 18, wherein the one or more computer-readable instructions further cause the computing device to:

categorize an additional mobile device as an unrooted mobile device based on the absence of the at least one feature in metadata that describes the additional mobile device; and allow the unrooted mobile device to connect to the secure network.

* * * * *